United States Patent [19]

Burr

[11] Patent Number: 4,701,756
[45] Date of Patent: Oct. 20, 1987

[54] FAULT-TOLERANT HIERARCHICAL NETWORK

[76] Inventor: William E. Burr, 14520 Gallant Fox La., Darnestown, Md. 20878

[21] Appl. No.: 774,493

[22] Filed: Sep. 10, 1985

[51] Int. Cl.$^4$ .............................................. H04Q 9/00
[52] U.S. Cl. ................................ 340/825.02; 370/16; 370/60; 340/825.5
[58] Field of Search ...................... 340/825.02, 825.03, 340/825.5, 825.06, 825.52; 370/16, 94, 85, 94; 179/18 EE, 18 EA; 371/7-11; 178/3

[56] References Cited

U.S. PATENT DOCUMENTS

| | | | |
|---|---|---|---|
| 4,156,798 | 5/1979 | Doelz | 178/3 |
| 4,347,498 | 8/1982 | Lee et al. | 340/825.02 |
| 4,417,334 | 11/1983 | Gunderson et al. | 370/16 |
| 4,488,151 | 12/1984 | Boulton et al. | 340/825.03 |
| 4,532,625 | 7/1985 | Stover | 370/16 |
| 4,536,874 | 8/1985 | Stoffel | 370/94 |
| 4,539,677 | 9/1985 | Lo | 370/94 |
| 4,561,088 | 12/1985 | Champlin et al. | 370/16 |
| 4,570,162 | 2/1986 | Boulton et al. | 340/825.52 |

OTHER PUBLICATIONS

H. Ikerman, E. S. Lee and P. I. P. Boulton, "High Speed Network Uses Fiber Optics", *Electronics Week*, Oct. 22, 1984.
W. E. Burr "A Fault-Tolerant Hierarchical Broadcast Network", Processing of Computer Networking Symposium, Dec. 11, 1984, National Bureau of Standards, Gaithersburg, MD, IEEE Computer Society.
F. Close, R. P. Lee "A Multi-Star Broadcast Network for Local-Area Communication" from Local Networks for Computer Communication, A. West et al. Editors, North Holland Publishing Co. 1981.
E. S. Lee, P. I. P. Boulton "A Glass Fiber Rooted-Tree Local Area Network" a Paper Presented at FOC/LAN for 1984.
E. S. Lee; P. I. P. Boulton "The Principles and Performance of Hubnet a 50 M Bits Glass Fiber Local Area Network" IEEE Journal on Selected Areas in Communication, vol. SAC-1, No. 5, Nov. 1983.

*Primary Examiner*—Donald J. Yusko
*Attorney, Agent, or Firm*—Jim Zegeer

[57] ABSTRACT

Hierarchical star or rooted tree networks have been implemented and have any desirable characteristics, including excellent performance, conceptual simplicity, and suitability for optical fiber implementations. However, they have a single point of vulnerability to catastrophic failure (the master or root hub) as well as vulnerabilities to single failures of links or hubs high in the hierarchy, which could disable large portions of the network. Redundant network components are added to eliminate this vulnerability and to make an economic but extremely robust and fault-tolerant network, while preserving the advantages of previous hierarchical networks.

7 Claims, 15 Drawing Figures

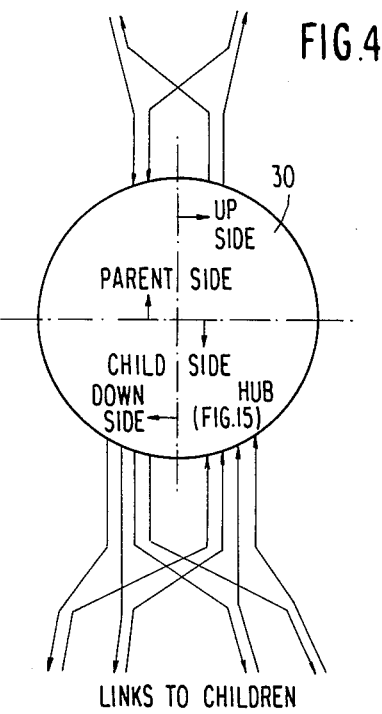
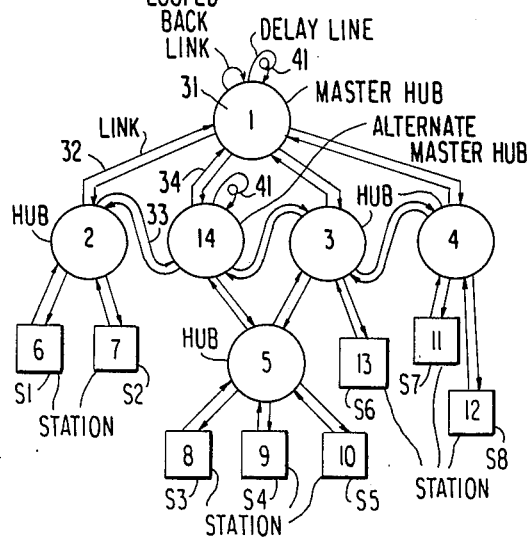
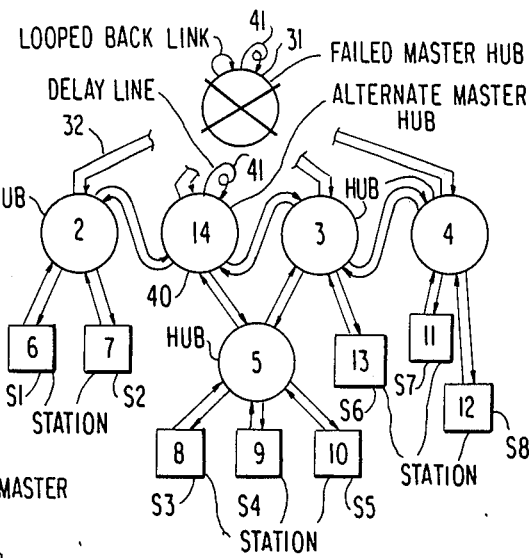
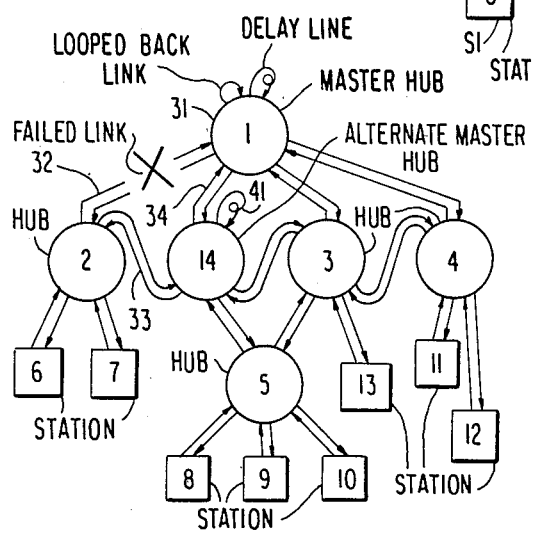

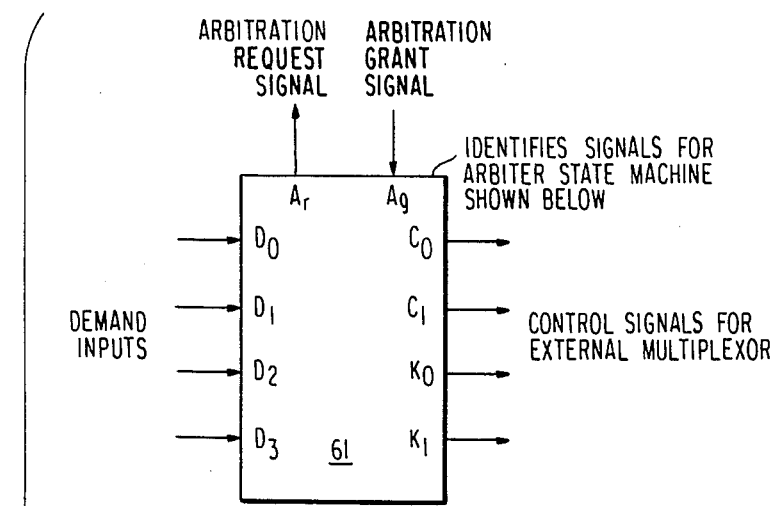
FIG.13
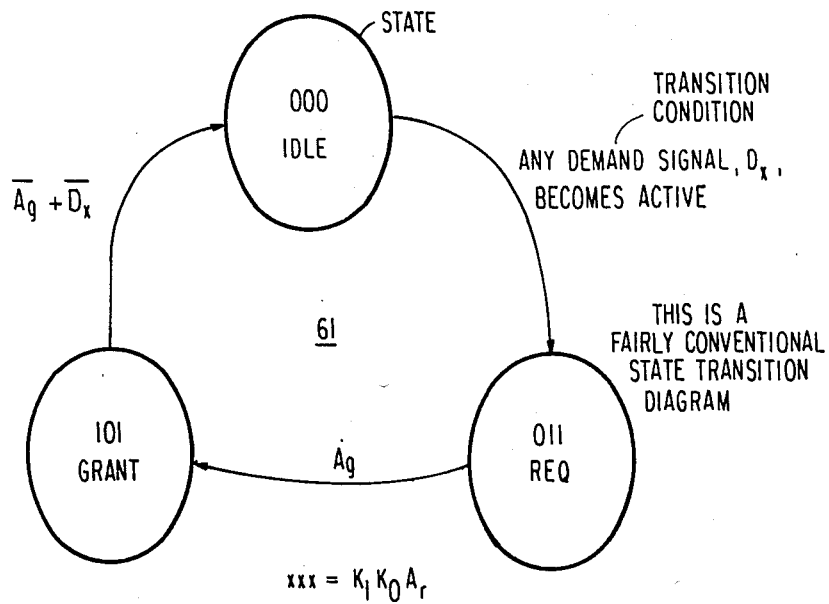

FIG.14

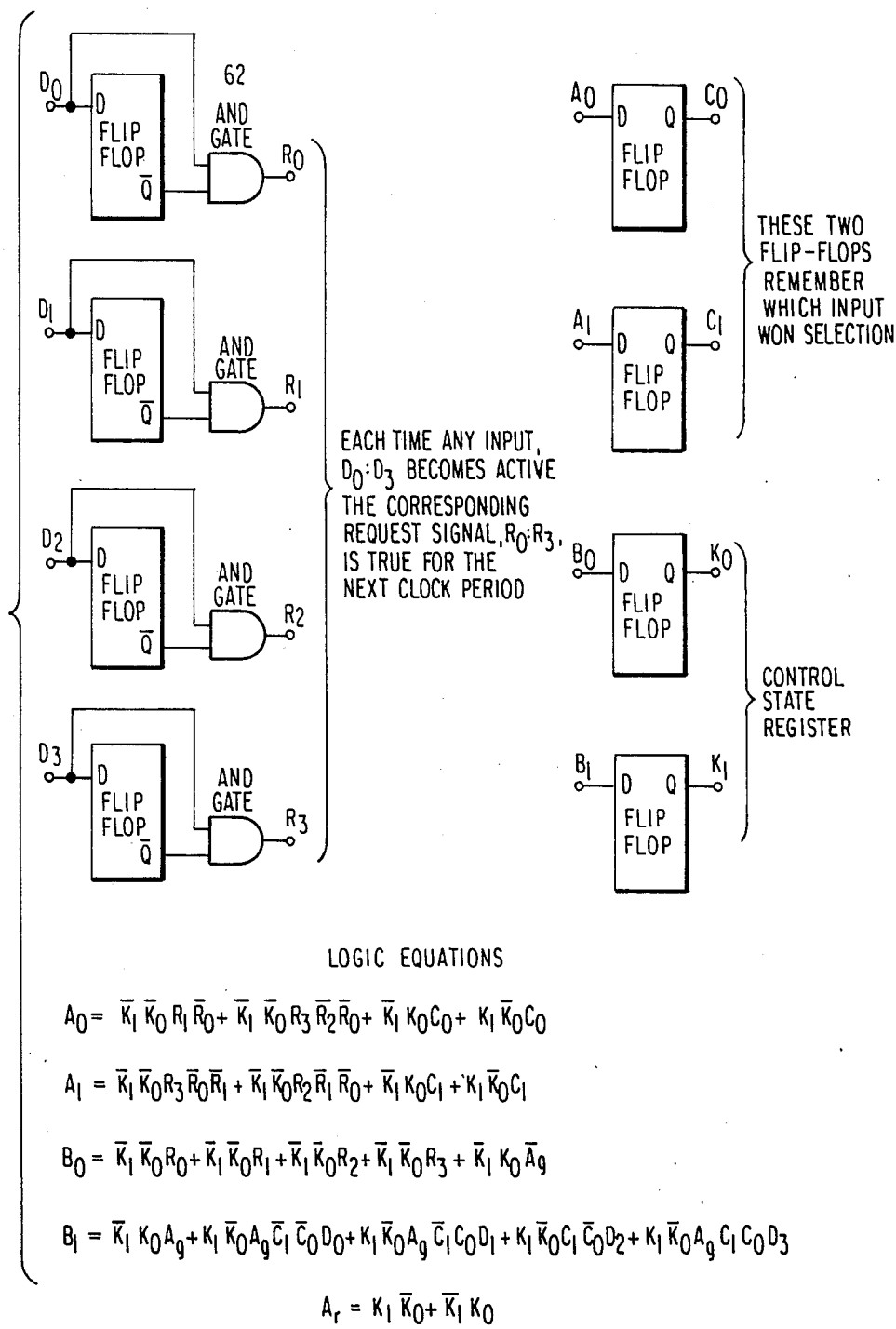

EACH TIME ANY INPUT, $D_0$-$D_3$ BECOMES ACTIVE THE CORRESPONDING REQUEST SIGNAL, $R_0$-$R_3$, IS TRUE FOR THE NEXT CLOCK PERIOD

THESE TWO FLIP-FLOPS REMEMBER WHICH INPUT WON SELECTION

CONTROL STATE REGISTER

LOGIC EQUATIONS $A_0 = \bar{K}_1 \bar{K}_0 R_1 \bar{R}_0 + \bar{K}_1 \bar{K}_0 R_3 \bar{R}_2 \bar{R}_0 + \bar{K}_1 K_0 C_0 + K_1 \bar{K}_0 C_0$ $A_1 = \bar{K}_1 \bar{K}_0 R_3 \bar{R}_0 \bar{R}_1 + \bar{K}_1 \bar{K}_0 R_2 \bar{R}_1 \bar{R}_0 + \bar{K}_1 K_0 C_1 + K_1 \bar{K}_0 C_1$ $B_0 = \bar{K}_1 \bar{K}_0 R_0 + \bar{K}_1 \bar{K}_0 R_1 + \bar{K}_1 \bar{K}_0 R_2 + \bar{K}_1 \bar{K}_0 R_3 + \bar{K}_1 K_0 \bar{A}_g$ $B_1 = \bar{K}_1 K_0 A_g + K_1 \bar{K}_0 A_g \bar{C}_1 \bar{C}_0 D_0 + K_1 \bar{K}_0 A_g \bar{C}_1 C_0 D_1 + K_1 \bar{K}_0 C_1 \bar{C}_0 D_2 + K_1 \bar{K}_0 A_g C_1 C_0 D_3$ $A_r = K_1 \bar{K}_0 + \bar{K}_1 K_0$

FAULT-TOLERANT HIERARCHICAL NETWORK

INTRODUCTION

Hierarchical or tree broadcast networks offer a number of advantages, including simple station design, the ability to accommodate very many stations and long links to remote stations, and excellent performance over a wide range of loads. Moreover such networks can be built by the repetition of identical hubs, and new stations or hubs inserted as needed, with automatic network reconfiguraton. Finally, they use only point-to-point links and are therefore suitable for fiber optic links with current fiber technology. Closs and Lee of IBM's Zurich research laboratory and Lee and Boulton of the University of Toronto have designed such networks and published reports on them. (the references referred to herein are fully identified at the end of this section) The Lee and Boulton effort has resulted in commercial 50 Mbit/s network product. Such networks, however, do have a catastrophic single point of failure, the master or root hub. The object of this invention is to make such hierarchical broadcast networks fault-tolerant. Generally, this is achieved by introducing redundancy into such networks to provide very robust networks with a high degree of tolerance to faults in hubs or individual data links.

BRIEF DESCRIPTION OF THE DRAWINGS

The above and other objects, advantages and features of the invention will become more apparent when considered with the following specifications and accompanying drawings wherein:

FIG. 4 is a schematic illustration of a modified hub repeater incorporating the invention.

FIG. 5 is a schematic illustration of a hierarchical network incorporating the invention.

FIG. 6 is a schematic illustration of the hierarchical network shown in FIG. 5 after total failure of the master hub.

FIG. 7 is a schematic illustration of the hierarchical network shown in FIG. 5 after a failure of one link.

FIG. 13 is a state diagram of the Selection subfunction of the Arbiter Function of the preferred embodiment shown in FIG. 10.

FIG. 14 illustrates the logic design of Selection Subfunction state machine shown in FIG. 13.

THE HIERARCHICAL STAR HUB AND NETWORK

Figure 1:
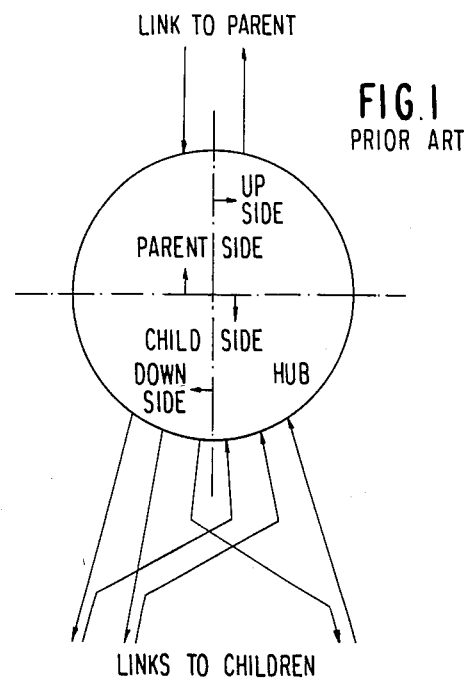
FIG. 1 schematically illustrates the basic prior art hierarchical network hub.

The terminology herein roughly follows that of Closs and Lee. FIG. 1 illustrates the basic prior art hierarchical network hub. Each hub has a "parent" side and a "child" side. On the parent side, there is one "up-link" to a parent hub and one "down-link" from that parent. The hub may have any number of "children," each connected via up and down-links. Whatever is received on the parent down-link is rebroadcast on all the children down-links. Whenever a packet begins on a child up-link, it contends against other child up-links, and, if no other up-link has already captured the "up-side" of the hub, may capture that up-side. That packet is then sent on the up-link to the parent hub. Packets from children contend at the parent only at the instant they arrive.

Figure 2:
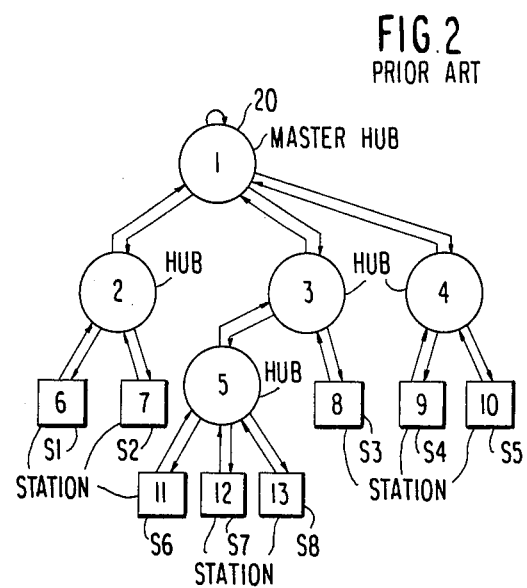
FIG. 2 is a schematic illustration of the interconnection of the hubs.
Figure 3:
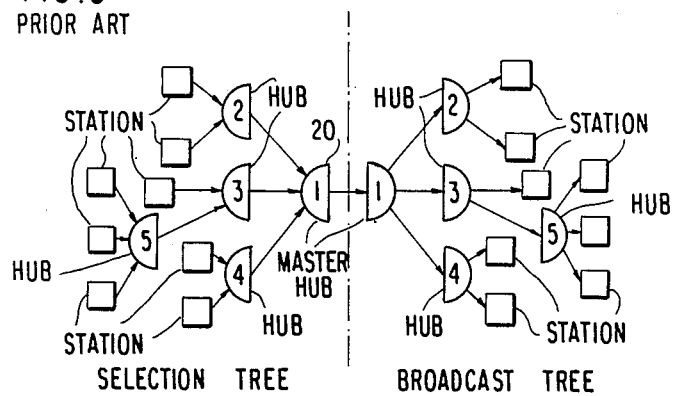
FIG. 3 is a schematic presentation using an alternative notation.

The hubs are interconnected as shown in FIG. 2. The key to the network operation is the "root" or "master" hub 20 at the top of the hierarchy. Its parent up-link is fed back into its parent down-link. Whichever child up-link captures the up-side of the master is fed back to the down-side, and from there to every down-link in the network. Thus, the packet which captures the master is broadcast to every station. $S_1, S_2, S_3, \ldots S_n$, in the network. Lee and Boulton use a somewhat different terminology to describe a similar network. They split the tree at the root or master hub and show the interconnected up-side as a "selection tree" and the interconnected down-sides as a "broadcast tree." FIG. 3 shows the network of FIG. 2 depicted using the notation of Lee and Boulton. The root or master hub is identified by the numeral 20.

However depicted, hierarchical star or rooted tree networks can be thought of as carrier sense multiple access with collision detection (CSMAS-CD) networks with a nearly zero "destructive collision window." Closs and Lee have implemented hubs where the arrival of two packets at a hub exactly at the same instant does cause a mutually destructive collision; the hub then recognizes this collision and stops sending both packets on its parent up-link. The collision-window is very small, only a few nanoseconds, determined by internal hub propagation and switching delays. Lee and Boulton have designed hubs which have no collision-window; that is, the hub always picks a clean "winner," even when two packets arrive exactly together.

Another way of looking at the hierarchical star network is to view it as an ALOHA network where one packet is guaranteed (or nearly guaranteed) to get through without damage. In fact Closs and Lee in their U.S. Pat. No. 4,347,498 and Lee and Boulton have stations practice what amounts to an ALOHA protocol; whenever they have a message to send, they start sending without concern for whether the network is active or idle. The station then "listens" to see if it "hears" its packet on its down-link within a maximum round-trip packet propagation delay. If not, it tries again and so on until it succeeds in capturing the network. What a transmitting station receives every other station also receives, so if that station received its own packet, so did every other network station.

This causes more or less statistically random arbitration of the network (stations nearer the master hub have some advantage). It is "fair" in the sense that every station gets some chance to "win" every rearbitration of the network, whatever the load, and may maximize network utilization under heavy load, but it does have some disadvantages: it is not possible to bound the maximum time a station trying to transmit must wait before successfully capturing the network, nor to absolutely guarantee that it will ever do so. It is all a matter of chance.

Hierarchical star networks may employ a central clock which originates at the master hub or can use independent clocks in each station and hub. Centrally clocked networks will require a larger number of phase lock loop or equivalent clock recovery circuits in hubs. Independently clocked hubs and stations need not use as many phase lock loop circuits, but a bit-synchronizing "preamble" field must precede each packet, increasing per-packet overhead. The Lee and Boulton network is centrally clocked, while Closs and Lee describe a network with independent clocks at each station.

PERFORMANCE

The performance of local networks is a complex subject, and fair, useful, direct comparisons of the performance characteristics of different networks are not easy. Nevertheless it is fairly easy to show that hierarchical star networks have excellent performance characteristics, which are demonstrably better in many respects than common alternative networks. This is because arbitration is fast (it takes a round-trip delay from the nearest station wishing to transmit to the master hub), arbitration delays are independent of the number of stations, and there is always, or nearly always, a clean winner from among the contending packets.

The arbitration delay in token passing networks, either rings or broadcast buses, goes up linearly with the number of stations if load is held constant. They are then poor choices for "sparse" networks: that is networks with many stations but characteristically light loads. CSMA-CD networks work very well for sparse situations, but suffer from the effects of collisions at high loads, which limit throughput and cause unpredictable access delays. As compared to CSMA-CD networks, Carrier Sense Multiple Access with Collision Avoidance (CSMA-CA) networks such as Hyperchannel (tm Network Systems Corp.) sacrifice some extra arbitration delay at light loads for extra throughput at high loads. Like token passing networks, however, the arbitration delay of CSMA-CA networks increases with the number of stations.

Both sparse and heavily loaded networks are of interest, and, of course, even networks which are normally lightly loaded may experience peak loads where they are heavily loaded. Access delay matters comparatively little in some applications, particularly if the network connects processors to fast storage devices, or if the network is used for real time process control. Hierarchical star networks have the considerable virtue that they exhibit nearly ideal characteristics in both the sparse and heavily loaded cases. Lee and Boulton have calculated the performance of such networks and show that they behave well under a variety of loads, including impulse loads which momentarily exceed network capacity.

FAILURE MODES AND RELIABILITY

Of the network types discussed above, CSMA/CD, token ring, token broadcast bus, and hierarchical star, CSMA/CA is often thought to be inherently the most reliable since it can use an entirely passive interconnection medium and has no analog collision detection problems. Passive failures of stations in CSMA/CA networks do not interfere with the operation of the network. Several schemes, including attenuating taps, are available to protect CSMA/CA networks from open or shorted "drop" cables. On the other hand they are usually not suitable for large networks with many stations or covering a comparatively large area, and are inherently somewhat vulnerable to cable damage.

CSMA/CD networks have tricky analog problems, if analog collision detection is employed at high data rates. This can make even comparatively minor cable discontinuities produce apparent collisions, and the cable itself is the weakness in these networks. A single cable fault can disable a large part or all of the network. CSMA/CD networks which us two channels, one in to a "head end" and the other out from the head end, do not necessarily have as much problem with cable faults, but do have a head end repeater which is a single active point of catastrophic network failure. Like CSMA/CA networks, passively failed or powered-off stations cause no problem.

The weakness of all token passing networks, ring or broadcast, is that every station in the token loop must pass the token on or respond to it. Procedures for recovering from lost or duplicate tokens and other protocol errors, considerably complicate their failure analysis. Every token network station is a complex state machine, and every network station actively participates in complex protocols for every arbitration of the network. Certainly protocol errors and recovery from them is a bigger concern with token passing networks than with other types of networks considered here. Moreover, physical rings have an inherent catastrophic vulnerability to the failure of any component in the ring: driver receiver, cable or station logic or power. Every component and every station must flawlessly pass or remove every packet without error or failure, or the effects are catastrophic. Station bypass relays, counter-rotating rings, battery power back-up, the distribution of interface power with the ring cable, and central wire-centers are all "band-aids" which can be applied to improve the reliability or availability or physical rings and reduce their vulnerability to catastrophic failure. Of these, central wire-centers offer the most complete solution, but they introduce considerable extra cost, cable, connectors and signal propagation delay to the network. When all is said and done, there can be little doubt that rings can be built to very high standards of reliability and availability, the issue is simply the cost of doing so.

Hierarchical star networks, like other non-token broadcast networks are immune to catastrophic failures caused by passively failed stations. Some protection is provided against "stuck-on" stations which continuously "jabber," since if the do not capture the network when the jabbering starts they will never do so. Jabbering stations generally cause catastrophic failures in most types of broadcast and ring networks. The master hub is however, a single active point of catastrophic network failure. Closs and Lee, in U.S. Pat. No. 4,347,498, observe that, whenever a packet captures the up-side of a hub and is passed up to a parent hub, a packet (not necessarily that packet) should be returned from the master hub within a round-trip delay. If not, the hub assumes a failed parent hub (or link to a parent hub) and reconfigures to loop back itself. In effect it becomes a master hub for all its children. If the master hub has n children, then after its failure there are n autonomous subnetworks. Communication is possible within subnetworks, but not between them.

THE INVENTION

A High-Availability Fault-Tolerant Hierarchical Network

Although the inherent reliability of hierarchical star networks is fairly good, according to this invention they can be made highly reliable and fault-tolerant. Specifically, they can be made:

a. Immune to catastrophic network failures caused by the total failure of any n hubs, where n is an arbitrary number.

b. Immune to catastrophic network failures caused by the failure of any n links, where n is an arbitrary number.

c. Immune to catastrophic network failures caused by continuously jabbering stations.

d. To guarantee some worst case maximum network access delay, whatever the network load, so that a station with a critical packet to transmit can be assured of doing so within some known maximum delay.

Networks built according to this invention will be suitable for applications where continued operation is vital, even in the face of failures or damage. They also will be sutable for applications which require that stations be guaranteed some worst-case network access time. Applications would include battlefield and shipboard Commmand, Control and Communications networks, where continued operation even in the face of battle damage is vital, police, public safety and other monitoring networks where there can be a high penalty for network failure, and where deliberate sabotage or accidental damage (as in fires or explosions) are a possibility, as well industrial process control applications where high reliability is vital and some worst case network access time must be guaranteed, whatever the network load. Networks built according to this invention can cover most applications of packet networks and will be particularly attractive whenever very high network reliability and availability are vital. They will do so with very little performance penalty, and with only a modest cost increase over networks which are not fault-tolerant.

To introduce fault-tolerance into hierarchical star networks, a generalization of the hub is required, permitting redundant links. The hubs described previously provide for only one parent, but if they are made a little more symmetrical, the hubs can have several parents (two is enough for one level of redundancy). FIG. 4 illustrates such a hub 30. The up-side is now nearly the mirror image of the down-side. X children are connected to the hub top Y parents. When the up-side is free, the first child up-link to receive a new packet captures the hub and that packet is then transmitted on all up-links to parents.

Recall that some hierarchical networks are centrally clocked and a clock signal is always present on network links and stations derive their transmit clock from the received signal, while other hierarchical networks have independent clocks at each network station. No signal is present on links between packets in the independently clocked networks. Data packets are preceded by a clock synchronizing "preamble" and the start of the data is marked by a unique delimiter character, and typically followed by a few trailer characters. In the centrally clocked case the master hub broadcasts clock synchronizing "idle" characters whenever it is not broadcasting a packet. A unique delimiter character marks the beginning of a packet and another delimiter character typically marks its end. Such techniques are commonly used in a wide variety of network topologies and are not unique to hierarchical networks.

The detailed operation of the down-sides varies slightly, depending upon whether the network is centrally clocked or independently clocked. In the centrally clocked case, since a carrier is always present a priority is assigned to each down-link from a parent and the signal, including clock-carrying idle characters, all signals received from the highest priority active parent are broadcast on all down links. In the independently clocked case, when the down-side is free, the first parent down link on which a packet start is received captures the down-side and the packet is broadcast to all children.

FIG. 5 illustrates the network of FIG. 2 with the addition of an alternate master hub 40 and redundant links to that hub 33. Each child hub is now connected directly or indirectly to both the master and alternate master hubs. The alternate master hub is also a child of the master hub, but its other (in the centrally clocked case also the lesser priority hub) parent link 41 is looped back to itself, as are both parent links of the master hub.

In the case of the independently clocked network only, the alternate master loop back must be through a delay line. No delay is required for centrally clocked networks. Delay lines can be made by a variety of means, including a simple coil of transmission cable, or they can be implemented internally or externally to the hub as a shift register. The delay line 41 of the alternate master must have a delay longer than the round trip time from the alternate master to the master and back (as described below, for the maximum protection the delay must be somewhat greater than that, to handle the failure of only the link between the master and alternate master hubs).

FIG. 6 illustrates the total failure of the master hub 31 as might occur in the event of a local power failure. Now the alternate master 40 simply acts as the master. In independently clocked networks some extra network signal propagation delay results, but complete interconnectivity is maintained.

Figure 8:
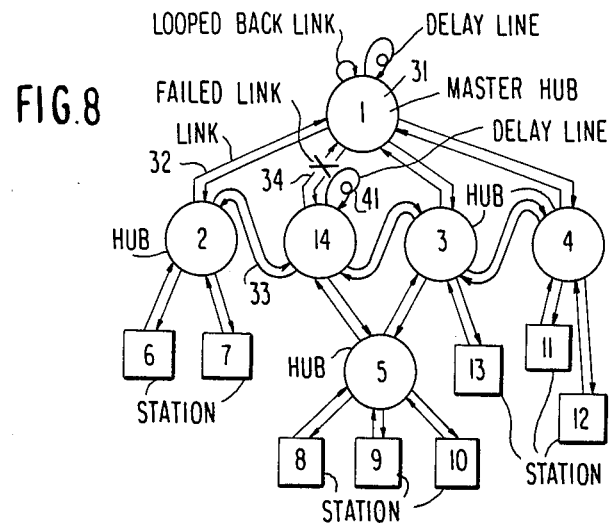
FIG. 8 is a schematic illustration of the network shown in FIG. 5 after failure of an alternate master hub link.

FIG. 7 illustrates the failure of the link 32 from child hub 2 to the master. Packets from the children of hub 2 now pass through the alternate master to the master and contend there to capture the whole network. Complete interconnectivity is maintained. FIG. 8 illustrates the failure of the link 34 between the master and alternate master hubs. In networks with independent clocks, this fault determines the required delay in the alternate master delay line 41. In independently clocked networks enough delay is required so that the round trips from either hub 2 or hub 3, through the alternate master 40 and back, is longer than the round trip from hub 2 or hub 3 through the master hub 31 and back. If this rule were not followed, different packets might be received by stations attached to different hubs.

Independently clocked networks according to this invention also require one additional rule: the minimum size packet must take longer to transmit than the greatest difference in one-way propagation delay between the shortest and longest path from any station to the master hub. This rule is necessary to prevent the network from generating duplicate copies of short packets.

In centrally clocked hierarchical networks each hub must have a means, sometimes called an elasticity buffer, to ensure that when a new up-link captures the hub, no phase-change occurs on transmitted up-link signals. Similar provisions are required in any star wired network with a central clock, and in many ring networks. In centrally-clocked networks the master 31 and alternate master 40 hubs must be capable of originating the clock signals.

Although the example of FIG. 5 shows one level of redundancy, and the network is immune to catastrophic failure caused by the total failure of any one hub, or any one link, the principle of the invention is not limited to only one level of redundancy. Any number n of alternate master hubs are permitted in the network, raising the level of redundancy and providing n levels of redundancy and immunity to catastrophic network failure caused by the failure of any n hubs and links.

Although the network as described above is immune to catastrophic failures caused by hubs and links, it is vulnerable to jabbering stations. This vulnerability is eliminated by including a packet timer in the hubs. The packet timer times the duration of every packet which captures the up-side of the hub. If the packet duration exceeds the maximum duration permitted in the network, then the packet is aborted by the hub and other packets are allowed to capture the up-side of the hub. A continuously jabbering station will never begin a new packet and thus can never recapture the up-side of a hub or the network.

The ALOHA station protocol used by previous hierarchical networks has one serious flaw in a high reliability network; because of the statistically random nature of the arbitration process there is no guaranteed maximum waiting time before a station with a high priority packet can capture the network in the face of contending traffic. Thus even though the network is operating properly a station could, by chance, be blocked from transmitting for an unacceptable length of time. This problem is avoided in this invention by equipping each station with a network idle timer. Recall that stations know when they have successfully transmitted a packet because they then receive that packet. Packets typically contain a source address field which is the only field which need be checked to determine if the received packet is the transmitted packet. After transmitting a packet, the station inhibits further transmission and begins timing the duration of every idle period. Transmission at that station remains inhibited until the network remains continuously idle for a time greater than the worst case network propagation delay plus a time which accounts for the delays in station logic. Thus every other station which "wants" to transmit at the time that station succeeded in transmitting a packet will get an opportunity to transmit a packet before that station again transmits.

SUMMARY OF ADVANTAGES

All hierarchical star or rooted tree networks have the following advantages:

Since only point-to-point connections are used they are suitable for any transmission medium, including fiber optics.

The entire network can be made by repetition of identical hubs.

The hubs have a very regular structure and are made by repetition of simple elements, thus are easily implemented in various kinds of large scale integrated circuits, including programmable arrays, semicustom and fully custom logic.

The simple, regular structure facilitates the testing of hubs.

Arbitration delay and overhead are small and are independent of the number of network stations.

Since arbitration is centralized in the network, individual stations are simplified and there are many more stations than hubs in the network.

Different transmission media are easily mixed in the same network.

A station can, in principle, be any distance from the master hub.

Packet collisions do not reduce network capacity even under sustained heavy loads.

In addition to the advantages of all hierarchical star or rooted tree networks, networks made according to this invention have the following advantages:

The network can be made immune to catastrophic network failures caused by the total failure of any number of hubs or links.

As much or as little fault-tolerance (redundancy) as needed or desired can be incorporated in the network.

The protocols are very simple and automatically handle most types of failures.

The network can be made immune to catastrophic network failure caused by continuously jabbering stations.

The worst case network access time can be absolutely bounded, allowing the network to be used in applications where some time-critical network access dependency exist.

PREFERRED EMBODIMENT

There are many considerations in the detailed design of a network embodying this invention. The most fundamental choice is whether there is to be a single master network clock which originates at the master hub, or independent clocks at stations and hubs. The embodiment described uses independent clocks at stations and hubs and is partitioned for programmable array logic. If high quantity production of hubs were desired, the design could be partitioned for a custom large scale integrated circuit.

Figure 9:
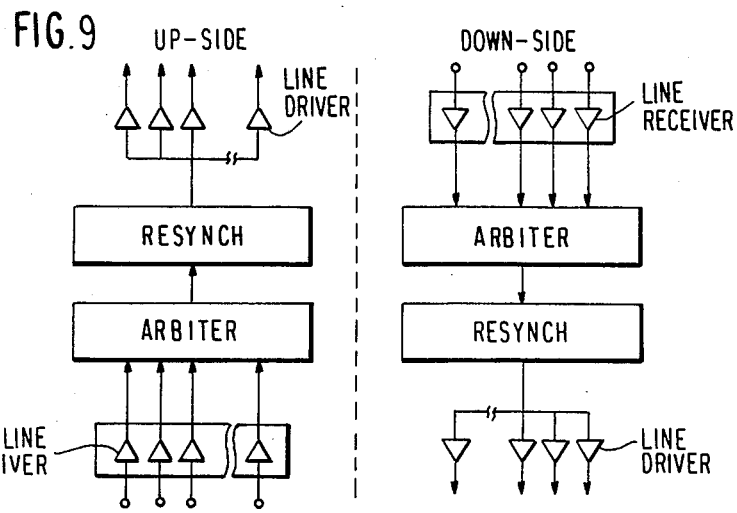
FIG. 9 is a block diagram illustration of the preferred embodiment of the invention.

FIG. 9 illustrates the block-function of a hub. Both the up and down sides are similar. An array of receivers 42 feed signals from a plurality of inputs to an arbiter 43. The arbiter picks one winner from among the competing inputs from the receivers. Input packets can only win arbitration at the start of a packet. The winning packet signals are passed to the resynchronizer 44, which reclocks the signals (thus preventing the build-up of jitter as the signals are passed to successive hubs), and then broadcast to a plurality of either parents or children by an array of line drivers 45.

Figure 10:
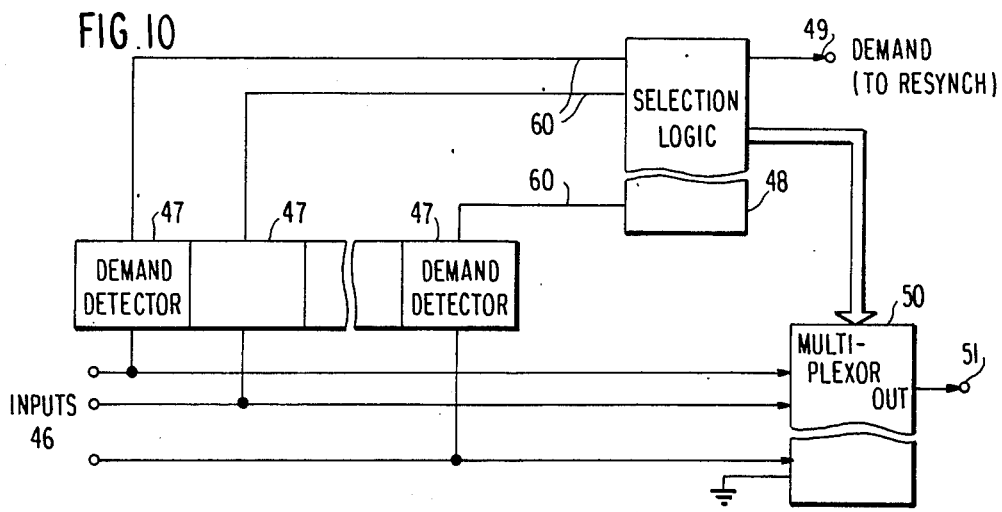
FIG. 10 is a block diagram illustration of the Arbiter Function of the preferred embodiment shown in FIG. 9.

FIG. 10 illustrates a multi-input arbiter which arbitrates among a plurality of contending inputs (the outputs of line receivers 42). An array of demand detector circuits 47, one per input, monitor the inputs. The demand detectors each pass a demand request signal 60 to the selection logic 48 which indicates whether that input is active or idle. The Selection logic picks a winner from the first packet or packets to begin on an input when the selection logic is idle. A DEMAND signal 49 indicates the active/idle state of the arbitration logic; this is passed to the resynchronizer. The selection logic also controls a multiplexor circuit 50 and selects the winning output 51 from among the contending inputs 46.

Figure 11:
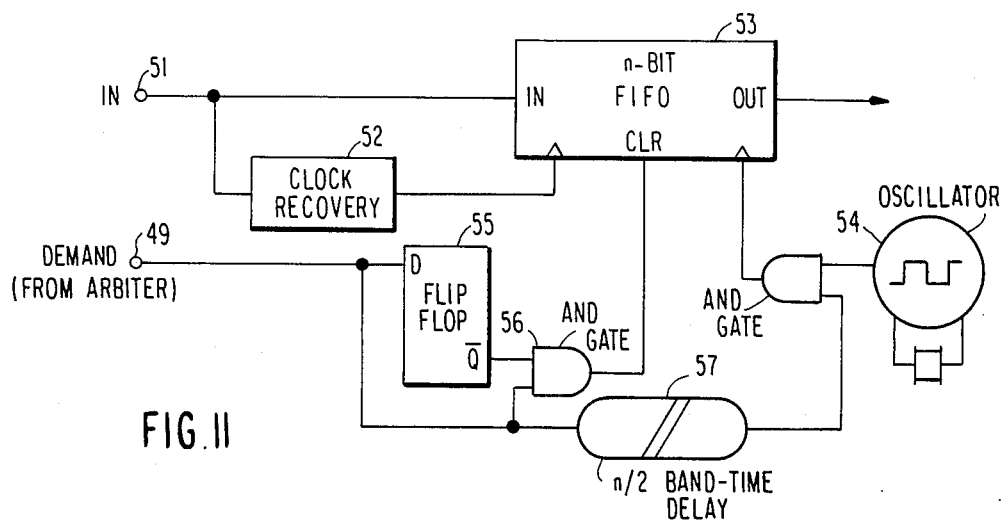
FIG. 11 is a block diagram illustration of the Resynchronizer function of the preferred embodiment shown in FIG. 9.

FIG. 11 illustrates the block design of the resynchronizer. The purpose of the resynchronizer is to prevent the cumulative build up of signal jitter as signals pass through successive hubs. In networks with comparatively low data rates, short distances, and few levels of hubs, the resynchronizer might be omitted or included only in the master and alternate master hubs, and satisfactory operation obtained. The input 51, also the output of the arbiter is passed to a clock recovery function 52 and an n-bit FIFO circuit 53. The clock recovery function's purpose is to extract the carrier clock from the input. Self-clocking codes which guarantee frequent signal transitions are typically used both in local networks and for long distance data transmission; a variety of techniques, including phase locked oscillators, may conventionally be used to recover the input clock signal. The size, n, of the FIFO circuit is determined by the stability and accuracy of the local oscillator circuits 54 and the maximum allowed packet size. Code bits are clocked into the FIFO using the input clock derived by the clock recovery circuit 52 and are clocked out by the local hub oscillator 54. A flip-flop 55 and an AND gate 56 detect the start of a packet from the DEMAND signal 49 and clear the FIFO 53. A time delay 57 allows the FIFO to partially fill before code bits are clocked out.

Figure 12:
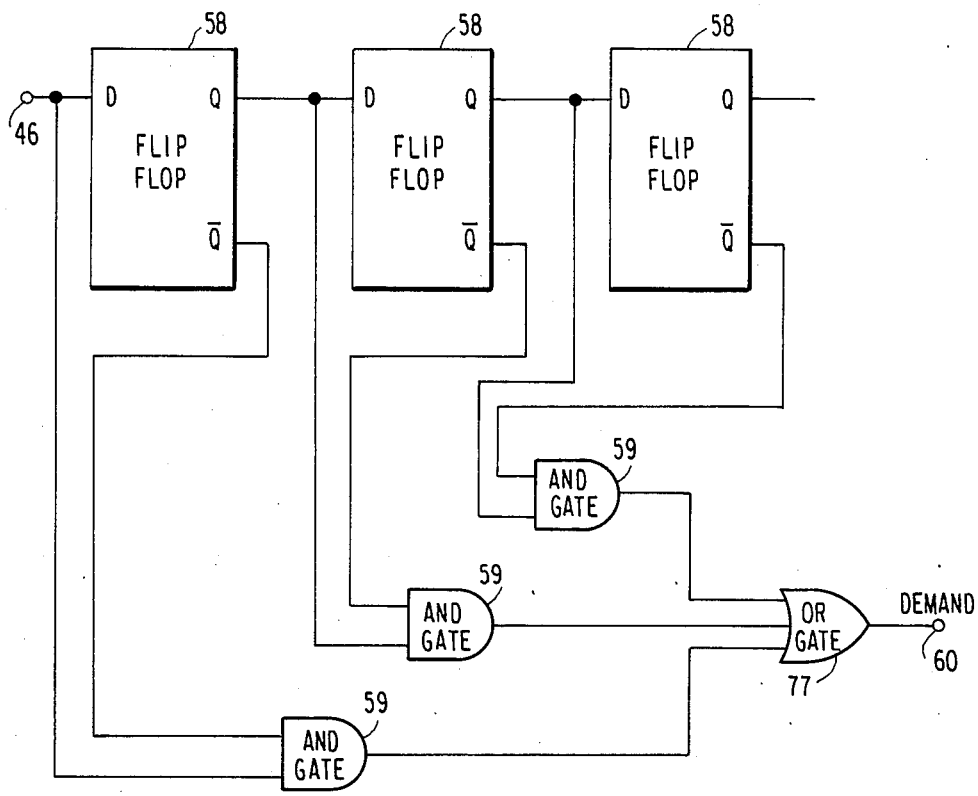
FIG. 12 is a circuit design for a Demand Detector for the preferred embodiment shown in FIG. 9.

FIG. 12 illustrates a demand detector circuit, used to determine whether an input is idle or active. It is suitable for the common Manchester code, which is widely used in networks. This code guarantees one signal transition for every data bit time and in some cases has two transitions per data bit. The demand is detected by clocking the input 46 through cascaded flip-flops 58 and AND gates 59 and thereby comparing the input value at several points in time. OR gate 77 supplies the outputs of AND gates 59 to output terminal 60. The clock for the detection logic is faster than the input carrier clock.

FIG. 13 illustrates a state machine 61 which performs selection logic 48 of FIG. 10. This state machine is capable of arbitrating 4 demand requests and can be cascaded to arbitrate 7, 11, or more demand requests. Each demand detector, one per input signal, generates a demand request signal $D_0$, $D_1$, $D_2$, $D_3$. Demand requests contend only at the instant of assertion. Signal $A_r$ is a request signal generated by the arbiter and used with the input grant signal Ag to cascade arbiter circuits and to allow a timer to interrupt a packet which exceeds the allowed maximum duration. The arbiter state machine has three states: IDLE, REQUEST and GRANT. A two-bit state register $K_1$, $K_0$ indicates the current state of the machine and $K_1$ is used externally to indicate that a selection has been made. A two-bit register $C_1$, $C_0$ indicates the selected input and is used to control an external multiplexor circuit 50. While the arbiter is in the IDLE state, the assertion of any demand request signal $D_x$ causes the Arbiter to enter the REQUEST state and assert the arbitration request signal $A_r$. If more than one demand request signal is simultaneously asserted, the arbiter logic picks a single "winner". The register $C_1$, $C_0$ is set to indicate the winning input. While in the REQUEST state the assertion of the arbitration grant signal Ag causes the arbiter to enter the GRANT state. While in the GRANT state the arbiter continues to assert $A_r$ and the state control register bit $K_1$ indicates that a grant has been made. The unassertion of either the $A_r$ signal or the selected demand request signal $D_x$ causes the arbiter to return to the IDLE state.

The arbiter state machine is realized with two sets of four flip-flops connected by combinational logic, and using $C_1$, $C_0$, $K_1$, $K_0$ as feedback terms as illustrated in FIG. 14. The first set of four flip-flops are used with an AND gate to generate a request pulse, $R_0 \ldots, R_3$, of one clock cycle duration, whenever a demand request $D_0 \ldots, D_3$ becomes asserted. The logic equations implementing the inputs $A_0$, $A_1$, $B_0$, and $B_1$ to the flip-flops whose outputs are $C_0$, $C_1$, $K_0$ and $K_1$, respectively, are shown in figure 14.

Figure 15:
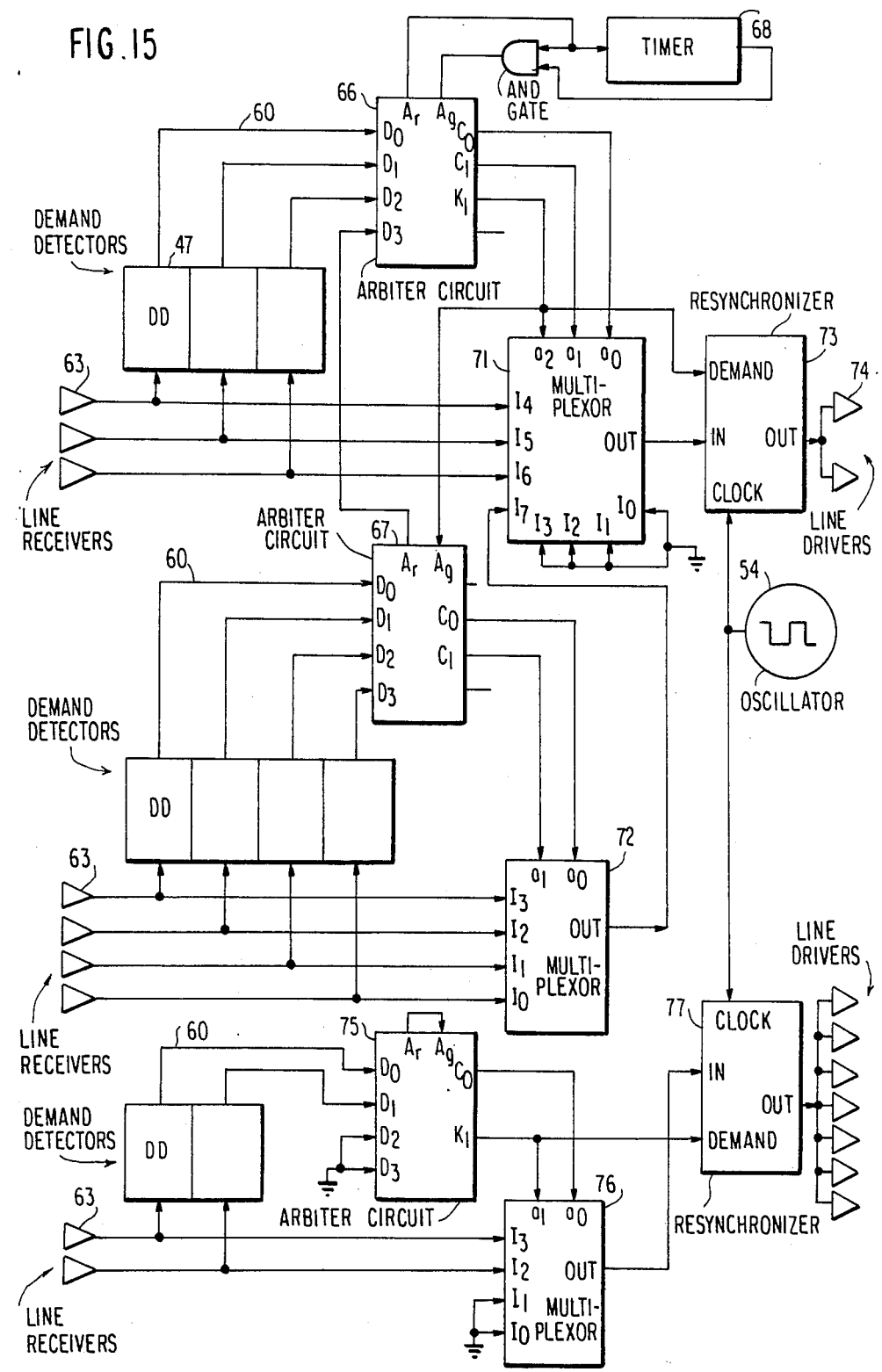
FIG. 15 illustrates the design of a specific 7-child by 2-parent fault tolerant hub preferred embodiment, using the functions illustrated in FIGS. 10, 11, 12, 13, 14, and 15.

FIG. 15 illustrates a 7-child by 2-parent hub built from the functions illustrated in FIGS. 10, 11, 12, 13 and 14. An array of 9 line receivers 63 receive the inputs from up to 7 children and 2 parents. For each input a demand detector 47 generates a demand request signal, $D_x$ 60. Demand request signals for the 7 children are fed into two cascaded arbiter circuits 66 and 67 (the arbiter circuits are shown in FIG. 15). A timer circuit 68 and an AND gate are used to with the arbitration request signal $A_r$ 69 to generate the arbitration grant signal Ag. If the packet exceeds the maximum length allowed in the network the timer expires causing the arbitration grant signal Ag to be unasserted and breaking the grant. This provides network protection against continuously jabbering stations the timer need only be included in master and alternate master hubs.

The outputs $C_1$, $C_0$ and $K_1$ of arbiter 66 are input to the address lines of 8-way multiplexor 71, controlling the selected input. In addition the $K_1$ of arbiter 66 serves as the arbitration grant signal Ag for cascaded arbiter 67. The outputs $C_1$, $C_0$ of arbiter 67 in turn generate the address inputs to 4-way multiplexor 72. The output of multiplexor 72 is an input to multiplexor 71, and the output from multiplexor 71 is the input data signal to resynchronizer 73. The signal $K_1$ from arbiter 66 serves as the demand input to resynchronizer 73. The output from resynchronizer 73 is sent via two of nine line drivers 74 to two parent hubs.

The down side is similar in operation. Arbiter 75 selects one of 2 inputs via multiplexor 76, and the output of multiplexor 76 is the input to resynchronizer 77. The output of resynchronizer 77 drives an array of 7 line drivers 74, each one driving a down-link to a child. Although up to four down-links for parents could be accommodated simply by adding line receivers and demand detectors, in most networks the one level of redundancy provided by two parent links will be sufficient.

While the invention has been shown and described with reference to a preferred embodiment of the invention, it will be understood by those skilled in the art that the above and other changes in form and detail may be made without departing from the spirit and scope of the invention as defined in the claims appended hereto.

What is claimed:

1. In a hierarchical broadcast network having a master hub, a plurality of child hubs, primary communication link means from each said child hub to said master hub, respectively, and a plurality of stations and secondary communication link means from each child hub to one or more stations, respectively, the improvement comprising, circuit means for rendering said network fault tolerant, including,
        an alternate master hub, further primary communication link means connecting said alternate master hub to said master hub, first redundant communication link means connecting said alternate master hub to at least one of said child hubs, and second redundant communication link means connecting the remaining ones of said child hubs to each other serially.

2. The hierarchical broadcast network defined in claim 1, including delay line means connected to said alternate master hub and having a delay longer than the round trip from the alternate master to the master and back.

3. The hierarchical broadcast network defined in claim 2, wherein said delay line means provides sufficient delay such that round trips from contiguous child hubs to said alternate master hub and back is longer than the round trip from said contiguous child hubs through said master and back.

4. The hierarchical broadcast network defined in claim 1, including means for said master and alternate master hub sensing the absence of a continuous clock signal from any hub above them in network hierarchy.

5. In a hierarchical broadcast network having a master hub, a plurality of child hubs, primary communication link means from each said child hub to said master hub, respectively, and a plurality of stations and secondary communication link means from each child hub to one or more stations, respectively, the method of rendering said network fault tolerant comprising the steps of, providing an alternate master hub, connecting said alternate master hub to said master hub by a further primary communication link means, connecting said alternate master hub to at least one of said child hubs by a first redundant communication link means, and connecting the remaining ones of said child hubs to each other serially by a second redundant communication link means.

6. The method of rendering hierarchical broadcast network fault tolerant as defined in claim 5, wherein upon any hub failing to receive a synchronizing clock signal or packet from any of a plurality of parent hubs above it in the network hierarchy thereupon is caused to function as a master hub by, selecting packets to be broadcast to a plurality of child hubs and stations from among the contending packets received from said child hubs and stations, and originating and broadcasting a synchronizing clock signal to said child hubs and stations in the intervals between packets.

7. The hierarchical network defined in claim 6, wherein each network hub contains a priority means for selecting one of a plurality of active links from parent hubs and broadcasting clock signals and packets received on said selected parent link to a plurality child hubs and stations.

* * * * *